United States Patent
Lowell (10) Patent No.: US 11,129,179 B2
(45) Date of Patent: Sep. 21, 2021

(54) INITIATING OR POSTPONING RADIO TRANSMISSIONS IN COMPLIANCE WITH DWELL TIME LIMITATIONS

(71) Applicant: Landis+Gyr Innovations, Inc., Alpharetta, GA (US)

(72) Inventor: Alan Blair Lowell, Duluth, GA (US)

(73) Assignee: Landis+Gyr Innovations, Inc., Alpharetta, GA (US)

(*) Notice: Subject to any disclaimer, the term of this patent is extended or adjusted under 35 U.S.C. 154(b) by 44 days.

(21) Appl. No.: 16/521,763

(22) Filed: Jul. 25, 2019

(65) Prior Publication Data

US 2021/0029727 A1 Jan. 28, 2021

(51) Int. Cl.
*H04W 72/12* (2009.01)
*H04W 72/04* (2009.01)

(52) U.S. Cl.
CPC ... *H04W 72/1263* (2013.01); *H04W 72/0453* (2013.01)

(58) Field of Classification Search
CPC ...................... H04W 72/1263; H04W 72/0453
See application file for complete search history.

(56) References Cited

U.S. PATENT DOCUMENTS

| | | | |
|---|---|---|---|
| 6,980,533 B1 | 12/2005 | Abraham et al. | |
| 8,416,750 B1* | 4/2013 | Vargantwar | H04W 72/1242 370/337 |
| 2013/0142118 A1* | 6/2013 | Cherian | H04L 45/00 370/328 |
| 2017/0048718 A1* | 2/2017 | Kim | H04W 56/0005 |
| 2019/0342915 A1* | 11/2019 | Kim | H04L 5/0053 |
| 2020/0053782 A1* | 2/2020 | Zhang | H04W 74/0816 |

OTHER PUBLICATIONS

"Fragmentation/Reassembly at the MAC layer", IEEE Draft; 1194037, IEEE-SA, Piscataway, vol. 802.11, retrieved on Mar. 19, 2001, pp. 1-18.
International Patent Application No. PCT/US2020/042991, International Search Report and Written Opinion, dated Sep. 29, 2020, 12 pages.

* cited by examiner

*Primary Examiner* — Harry H Kim
(74) *Attorney, Agent, or Firm* — Kilpatrick Townsend & Stockton LLP (57) ABSTRACT

A method includes identifying a packet for transmission and determining a radio channel for the transmission of the packet. The method further includes determining that the packet is in a restricted class and, responsive to the packet being in the restricted class, determining a dynamic maximum available time on the radio channel based on a reserved time and a dwell time limit. The method further includes calculating a remaining dwell time on the radio channel based on a comparison of a spent dwell time on the radio channel to the dynamic maximum available time. Further, the method includes determining a transmission duration for transmitting the packet over the radio channel and, responsive to the remaining dwell time being less than the transmission duration, postponing the packet.

17 Claims, 8 Drawing Sheets

INITIATING OR POSTPONING RADIO TRANSMISSIONS IN COMPLIANCE WITH DWELL TIME LIMITATIONS

TECHNICAL FIELD

Various embodiments of the invention relate to radio communications and, more particularly, to initiating or postponing radio transmission in compliance with dwell time limitations.

BACKGROUND

Radio frequency (RF) radios are required, by regulation of the Federal Communications Commission (FCC) or other regulating body, to limit channel occupation time on each available radio channel. More specifically, the FCC requires that each radio occupies a channel for no more than four hundred milliseconds during each rolling twenty-second window. This regulation applies to data packets with substantive content as well as to acknowledgements and other network maintenance packets. Further, for each radio, this regulation applies to each radio channel on an individual basis, such that, for a single radio, the limit on channel occupation is applied for each radio channel individually. Typically, utility meters participate in mesh networks or other networks, and thus, a utility meter may incorporate an RF radio for the purpose of communicating with other nodes in the network. As a result, utility meters are required to comply with any regulations related to channel occupation time, also referred to as dwell time, on radio channels.

Nodes, including utility meters, within a single mesh network hop among radio channels according to an established channel-hopping schedule. For instance, the schedule indicates an order of channels to be used by the mesh network, and the nodes generally send and receive on a single channel in that sequence for a time slot having a predetermined length. Thus, each node is aware of which channel to use for each time slot and which channel to hop to at the end of a time slot.

In the field of utility meters, mesh networks are used to transmit not only substantive data packets, but also administrative packets such as beacons and acknowledgements. A beacon is sent periodically to maintain synchronization among radios in a mesh network. For instance, beacons indicate the schedule of radio channels described above, such that nodes in the network know which channels to use at which times, and beacons may indicate the current time for usage by radio devices. For instance, a beacon may require fifteen milliseconds to transmit, thus requiring fifteen milliseconds on a radio channel. A utility meter typically sends an acknowledgment in response to receipt of a data packet, and the acknowledgement confirms to a sender that the data packet was received. An acknowledgement may require two milliseconds to transmit, thus utilizing two milliseconds. Both beacons and acknowledgements, as well as other administrative packets, are counted toward dwell time.

In North America, there may be sixty-four radio channels in a frequency band used by a utility meter, and the limitation on dwell time applies to each radio channel individually. As a result, devices utilizing radios must find a way to keep track of their dwell time on each radio channel. Other numbers of channels may also be used. For example, in Hong Kong, there may be only eleven radio channels used by a similar device, and in India, there may be ten. With the reduced number of radio channels, efficient use of dwell time becomes even more critical.

SUMMARY

A non-limiting example of an implementation of the invention is a method for gating data transmissions. The method includes identifying a packet for transmission and determining a radio channel for the transmission of the packet. The method further includes determining that the packet is in a restricted class and, responsive to the packet being in the restricted class, determining a dynamic maximum available time on the radio channel based on a reserved time and a dwell time limit. The method further includes calculating a remaining dwell time on the radio channel based on a comparison of a spent dwell time on the radio channel to the dynamic maximum available time. Further, the method includes determining a transmission duration for transmitting the packet over the radio channel and, responsive to the remaining dwell time being less than the transmission duration, postponing the packet.

Another non-limiting example of an implementation of the invention is a node. The node includes a radio configured to transmit a plurality of packets across a plurality of available radio channels, a processor configured to execute computer-readable instructions, and a memory configured to store the computer-readable instructions. When executed by the processor, the computer-readable instructions cause the processor to perform the following operations: The processor identifies a packet for transmission and determines a radio channel, from among the plurality of radio channels, for the transmission of the packet. The processor determines that the packet is in a restricted class and, responsive to the packet being in the restricted class, determines a dynamic maximum available time on the radio channel based on a reserved time and a dwell time limit. The processor calculates a remaining dwell time on the radio channel based on a comparison of a spent dwell time on the radio channel to the dynamic maximum available time. Further, the processor determines a transmission duration for transmitting the packet over the radio channel and, responsive to the remaining dwell time being less than the transmission duration, postpones the packet.

Yet another non-limiting example of an implementation of the invention is a computer-program product for gating a radio transmission. The computer-program product includes a computer-readable storage medium having program instructions embodied thereon. The program instructions are executable by a processor to cause the processor to perform the following operations: The processor identifies a packet for transmission and determines a radio channel for the transmission of the packet. The processor determines that the packet is in a restricted class and, responsive to the packet being in the restricted class, determines a dynamic maximum available time on the radio channel based on a reserved time and a dwell time limit. The processor calculates a remaining dwell time on the radio channel based on a comparison of a spent dwell time on the radio channel to the dynamic maximum available time. Further, the processor determines a transmission duration for transmitting the packet over the radio channel and, responsive to the remaining dwell time being less than the transmission duration, postpones the packet.

These illustrative aspects and features are mentioned not to limit or define the presently described subject matter, but to provide examples to aid understanding of the concepts described in this application. Other aspects, advantages, and features of the presently described subject matter will become apparent after review of the entire application.

BRIEF DESCRIPTION OF THE FIGURES

These and other features, aspects, and advantages of the present disclosure are better understood when the following Detailed Description is read with reference to the accompanying drawings.

DETAILED DESCRIPTION

Many existing radios inefficiently utilize their dwell time on each channel, especially in the case of high-traffic conditions. To maintain network operations, it is critical that administrative packets, such as beacons and acknowledgements are sent and received as expected. For instance, a node receives a data packet and would typically transmit an acknowledgement on the same channel by which the data packet was received. However, if the node has used all of its dwell time (e.g., 400 milliseconds) for the current channel in a current rolling time window (e.g., 20 seconds), the node cannot send the acknowledgement. As a result, the data packet may be discarded, and the sender will resend the data packet upon failing to receive the acknowledgement. This leads to inefficient use of network bandwidth and unnecessary additional network traffic.

Some implementations of the invention address the above shortcomings of existing methodologies by more effectively conserving dwell time. More specifically, a gating system according to some implementations reserves a portion of the dwell time on each channel for a certain class of packets, referred to herein as allowed packets. In some implementations, allowed packets are administrative packets, such as beacons and acknowledgements. When a device prepares to transmit an allowed packet over a radio channel, the gating system of that device determines whether enough dwell time remains for transmission of the administrative packet. If not enough dwell time remains, then the allowed packet is held (e.g., postponed) or dropped rather than being transmitted right away. However, in the case of a data packet that is not an allowed packet (e.g., is not administrative), the gating system determines whether enough dwell time remains when excluding the time reserved for allowed packets. In other words, in some implementations, the time that is reserved is allowed to be used only by packets in the allowed class. If not enough dwell time remains, then the data packet is held, or postponed.

In some implementations, determination of whether to transmit a data packet, also referred to herein as a packet, at the current time and on the current channel is based in part on categorization of the packet as an allowed packet, or lack thereof, and on a reservation of dwell time for allowed packets. As a result, the gating system may ensure that allowed packets can be sent as needed, thus reducing unnecessary network traffic resulting from dropped packets.

Figure 1:
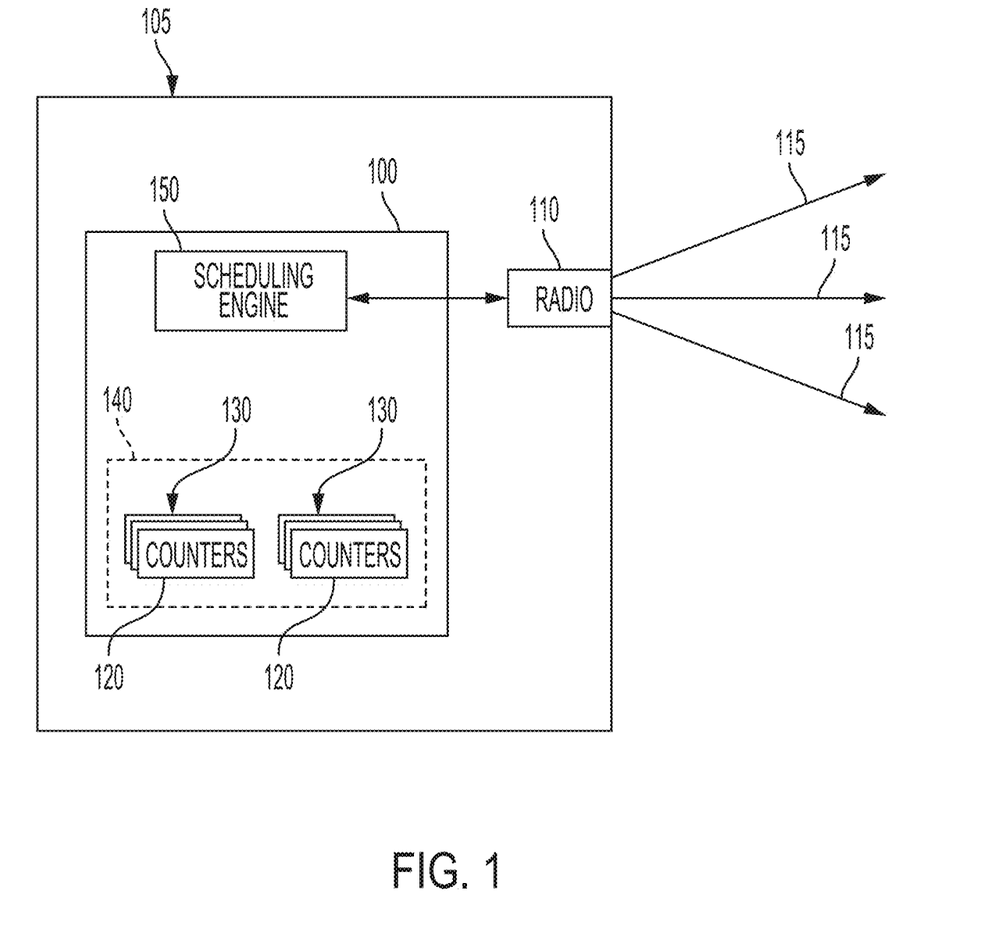
FIG. 1 is a conceptual diagram of a node with an integrated gating system, according to some implementations of the invention.

FIG. 1 is a conceptual diagram of a node 105 with an integrated gating system 100, according to some implementations of this invention. The node 105 is a device utilizing a radio 110 for communications within a network including one or more other nodes. For example, and not by way of limitation, each node 105 in the network is a utility meter, a router, a collector, an administrative node, or other type of node participating in network communications. The gating system 100 may be in communication with the radio 110 of the with which the gating system 100 is integrated, so as to initiate the transmission of data packets by instructing the radio 110 to transmit data packets as described herein. Although the example of FIG. 1 shows that the gating system 100 is integrated with the node 105, it will be understood that, alternatively, the gating system 100 may be separate from the node 105 but in communication with the node 105.

As shown in FIG. 1, the gating system 100 may include a scheduling engine 150, which determines when to transmit data packets by way of the radio 110. To this end, scheduling engine 150 may track spent dwell time for each radio channel 115. In some implementations, for this purpose, the gating system 100 includes a set of counters 120, together referred to herein as a counter set 130, which keeps track of spent dwell time over a rolling time window. Through tracking spent dwell time, the scheduling engine 150 may both ensure compliance with a cap on the dwell time within the rolling time window and reserve time for administrative packets or other allowed packets. The scheduling engine 150 may be implemented as hardware, software, or a combination of both. For example, and not by way of limitation, the scheduling engine 150 may be a combination of one or more software functions or may be a specialized hardware circuit.

In some implementations, the counter set 130 includes a plurality of subsets of counters 120, where each subset of counters 120 is referred to herein as a counter subset 140. Each counter subset 140 includes one or more counters 120. In some implementations, the counter set 130 is associated with the node 105 as a whole, and each counter subset 140 is assigned to and thus associated with a corresponding radio channel 115 for tracking dwell time with respect to that radio channel 115. In some implementations, there is a one-to-one correspondence between counter subsets 140 and radio channels 115, also referred to as channels 115, utilized by the node 105. For instance, if the node 105 uses sixty-four radio channels 115, then the node 105 may also utilize sixty-four counter subsets 140. It will be understood, however, that the number of counter subsets 140 used can vary.

Each counter 120 may be implemented in hardware, software, or a combination of both. For example, and not by way of limitation, each counter 120 may be a special-purpose register dedicated to the purpose of counting spent dwell time as described herein. For another example, each counter may be a software variable stored in memory. This variable may hold a numerical value, such as an integer representation of spent dwell time. It will be understood that various possible implementations exist, and that one or more of such implementations are useable as described herein.

In some implementations, the radio 110 is a two-way radio configured to transmit data packets over a predetermined set of radio channels 115. For example, and not by way of limitation, the radio 110 may transmit data packets over sixty-four established channels 115 in a band.

Figure 2:
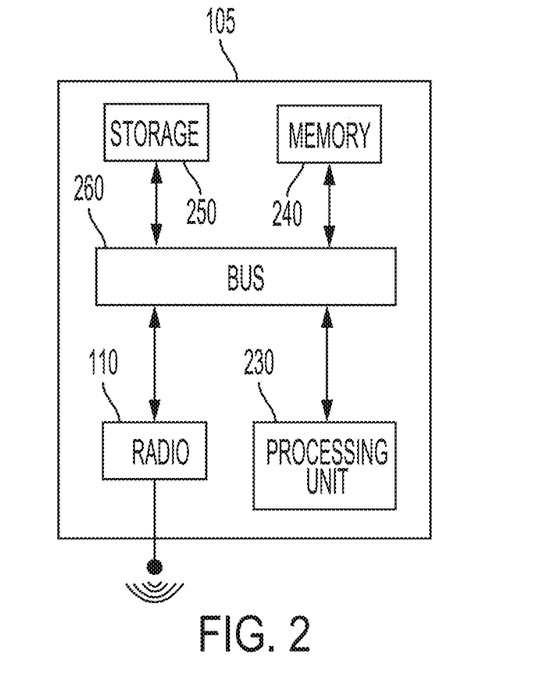
FIG. 2 is an architectural diagram of a node with an integrated gating system, according to some implementations of the invention.

FIG. 2 is an architectural diagram of a node 105 with an integrated gating system 100, according to some implementations of this invention. As shown in FIG. 2, the node 105 may include a processing unit 230, a memory 240, a storage 250, and a radio 110, which may be in communication with one another by way of a bus 260. For example, and not by way of limitation, the memory may be random-access memory (RAM), and the storage 250 may be flash storage or read-only memory (ROM). Although the processing unit 230, the memory 240, the storage 250, the radio 110, and the bus 260 are shown and described herein as being distinct components, it will be understood that this distinction is for illustrative purposes only. For instance, the processing unit 230, the memory 240, and the storage 250 may be integrated together into a single chip, such as a microcontroller unit.

As described in detail herein, in some implementations, the scheduling engine 150 performs various operations to ensure that the node 105 does not exceed its dwell time limit on a radio channel 115. The operations of the scheduling engine 150 may be embodied as program instructions stored in a computer-readable medium, such as the storage 250 or the memory 240. In some implementations, the computer-readable medium is a non-transitory computer-readable medium. The counter set 130 described herein may be stored in memory 240 and accessible to the processing unit 230. The processing unit 230 may execute the program instructions to implement the scheduling engine 150, with reference to the counter set 130, as described herein.

Figure 3:
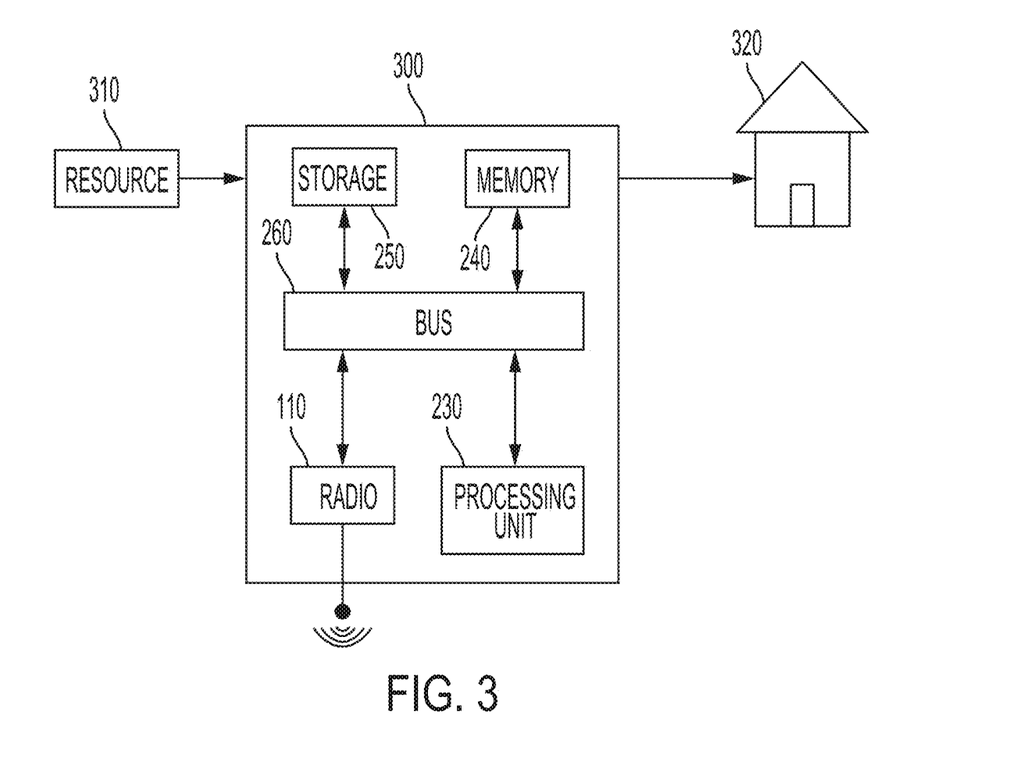
FIG. 3 is a block diagram of a utility meter with an integrated gating system, according to some implementations of the invention.

FIG. 3 is a block diagram of a utility meter 300 with an integrated gating system 100, according to some implementations of this invention. The utility meter 300 is an example of a node 105 that can utilize implementations of the invention described herein. As shown in FIG. 3, the utility meter 300 measures consumption of a resource 310 occurring on a premises 320. Although not shown, the utility meter 300 may include a metrology module, which detects one or more signals to measure use of the resource 310 on the premises 310. As with other types of nodes 105, the utility meter 300 may further include a processing unit 230, a memory 240, a storage 250, and a radio 110, which may be in communication with one another by way of a bus 260. Further, as described above, the processing unit 230 may execute program instructions to implement the operations described herein.

It will be understood that a node 105, as described herein, is not limited to a utility meter 300. Rather, a node 105 may be various types of computing devices configured to transmit communications over radio 110. For example, the node 105 may be a computing device that complies with the IEEE 802.15.4 and 6LoWPAN technical standards for low-power, lossy wireless personal area networks.

Referring back to FIG. 1, more generally, the node 105 transmits data packets by way of its radio 110 in the due course of operation of the node 105, and the node 105 may channel-hop among radio channels 115 according to a schedule. For example, and not by way of limitation, if the node 105 is a utility meter 300, or is connected to a utility meter 300, the node 105 may periodically transmit data packets including consumption data that describes resource consumption measured or otherwise collected by the node 105. The node 105 may transmit such data packets to one or more other nodes in a mesh network, such that the consumption data eventually arrives at a headend unit for analysis or billing.

As described above, for each radio channel 115, the dwell time for a single device may be capped at a dwell time limit (e.g., four hundred milliseconds) per rolling window of time (e.g., twenty seconds). Conventionally, each data packet to be sent by way of the radio 110 receives the same treatment: it is determined whether transmitting a data packet would cause the device to exceed four hundred milliseconds in a rolling window of twenty seconds on a particular channel 115, and if so, the data packet is postponed or dropped. There is no existing mechanism for reserving a portion of the dwell time for certain types of packets.

In implementations of the present invention, however, a portion of dwell time is reserved for a first class of packets, also referred to herein as the allowed class. The result of this reservation is that a portion of the dwell time limit is reserved time, useable for the transmission of the first class of packets. For example, and not by way of limitation, the first class of packets are administrative packets, and a portion of the dwell time limit is reserved for administrative packets. More specifically, for instance, beacons and acknowledgements are packets deemed administrative, while other forms of data are deemed non-administrative. However, it will be understood that this categorization is illustrative, and that other categorizations can be used.

In some implementations, the reserved time is not used for a second class of data packets, also referred to herein as the restricted class. The restricted class may be mutually exclusive with the allowed class. In other words, only the allowed class of packets are allowed to be transmitted during the reserved time, and all other packets are deemed to be in the restricted class, which are not be transmitted during the reserved time in some implementations. Thus, in the above example, in which beacons, acknowledgements, and other packets deemed administrative are in the allowed class, all packets deemed non-administrative are not allowed to be transmitted during the reserved time.

The reserved time may be a predetermined percentage of the dwell time limit or may be a fixed amount of time. For example, and not by way of limitation, the reserved time may be five percent of the dwell time limit. Thus, if the dwell time limit is four hundred milliseconds, the reserved time is five percent of four hundred milliseconds, which is twenty milliseconds. Generally, in some implementations, only the data packets categorized as being in the allowed class are transmitted during the reserved time.

In some implementations, if a data packet in the restricted class cannot be transmitted over a first radio channel 115 while staying within the dwell time limit less the reserved time, the data packet is held (i.e., is not yet transmitted). However, if the data packet in the restricted class can be transmitted over the first radio channel 115 while staying within the dwell time limit less the reserved time, radio transmission is initiated for the data packet, and the data packet is transmitted over the first radio channel 115. In contrast, if a packet in the allowed class cannot be transmitted over a first radio channel 115 while staying within the dwell time limit, the data packet is held. If the data packet in the allowed class can be transmitted over the first radio channel 115 while staying within the full dwell time limit, radio transmission is initiated for the data packet, and the data packet is transmitted over the first radio channel 115. In some implementations, the reserved time is not considered (i.e., is not subtracted from the dwell time limit) when determining whether to postpone a data packet in the allowed class.

In other words, when determining whether to initiate a radio transmission for a packet or to hold the data packet, a maximum available time is considered, where that maximum available time is dynamic based on whether the data packet is in the allowed class. Specifically, when determining whether to initiate a radio transmission for a packet or to hold the data packet, the scheduling engine 150 may compare the maximum available time to the amount of dwell time that has been spent plus the time to transmit the data packet in question. In some implementations, for an allowed packet, the maximum available time is the dwell time limit, while for a restricted packet, the maximum available time is the dwell time limit less the reserved time. In the same way that dwell time is limited for each radio channel 115 on an individual basis, the maximum available time is applicable to each individual radio channel 115. In other words, for each radio channel 115, the scheduling engine 150 tracks dwell time spent on that channel and determines whether data packets can be transmitted without exceeding the maximum available dwell time based on dwell time spent on that channel 115. However, in some implementations, the maximum available time is dynamic based on categorization of a given data packet, while the dwell time limit is fixed.

In some implementations, when it is determined that a data packet should be transmitted over a radio channel 115 (i.e., the data packet does not cause the maximum available time on the radio channel 115 to be exceeded), radio transmission of the data packet is initiated. More specifically, in some implementations, the data packet is transmitted over the radio channel 115 immediately or as soon as possible or, more specifically, prior to any other data packet being transmitted over the current radio channel 115 such that re-determination of whether the data packet fits within the maximum available time (i.e., whether transmitting the data packet in addition to the spent dwell time would not exceed the maximum available time) would need to occur.

As mentioned above, a data packet may be held due to not fitting within the maximum available time of a first radio channel 115. More specifically, in some implementations, the node 105 holds such a data packet until that data packet can be sent within the maximum available time (i.e., without exceeding the dwell time limit less, when applicable, the reserved time). In some implementations, the node 105 maintains a queue of data packets to be transmitted over the radio 110. The scheduling engine 150 may consider the first packet in the queue, which may be at the front or top of the queue, by determining whether the first packet can be sent within its respective maximum available time. If the first packet can be sent over the current radio channel 115 within the maximum available time for the current radio channel 115 applicable to the first packet, then the node 105 sends the first packet. However, if the first packet cannot be sent over the current radio channel 115 within the maximum available time for the current radio channel 115 applicable to the first packet, then the scheduling engine 150 may postpone the first packet for later transmission.

As described above, the node 105 may channel-hop according to a schedule. After the first packet has been held, when the node 105 hops to a different radio channel 115, or when a predetermined period of time has passed, the scheduling engine 150 may reconsider transmitting the first packet along with any other data packets that have been held. Because each radio channel 115 is associated with a respective amount of spent dwell time, transmission of a data packet over a first radio channel 115 without exceeding the maximum available time may be possible although transmission of the same data packet over a second radio channel 115 without exceeding the maximum available time may not be possible. Further, because the rolling time window, to which both the dwell time limit and the maximum available time apply, will have shifted after the passage of time, the node 105 may send the first packet at a later time.

The scheduling engine 150 may use the counter set 130 to track spent dwell time (i.e., how much dwell time has been used) for each radio channel 115, which is necessary in some implementations for determining whether transmission of a particular data packet would cause the node 105 to exceed the maximum available time on a radio channel 115. As mentioned above, each counter subset 140 may be assigned to, and thereby associated with, a respective radio channel 115. Together, the counters 120 in a counter subset 140 for a radio channel 115 may represent spent dwell time in a rolling time window.

Figure 4A:
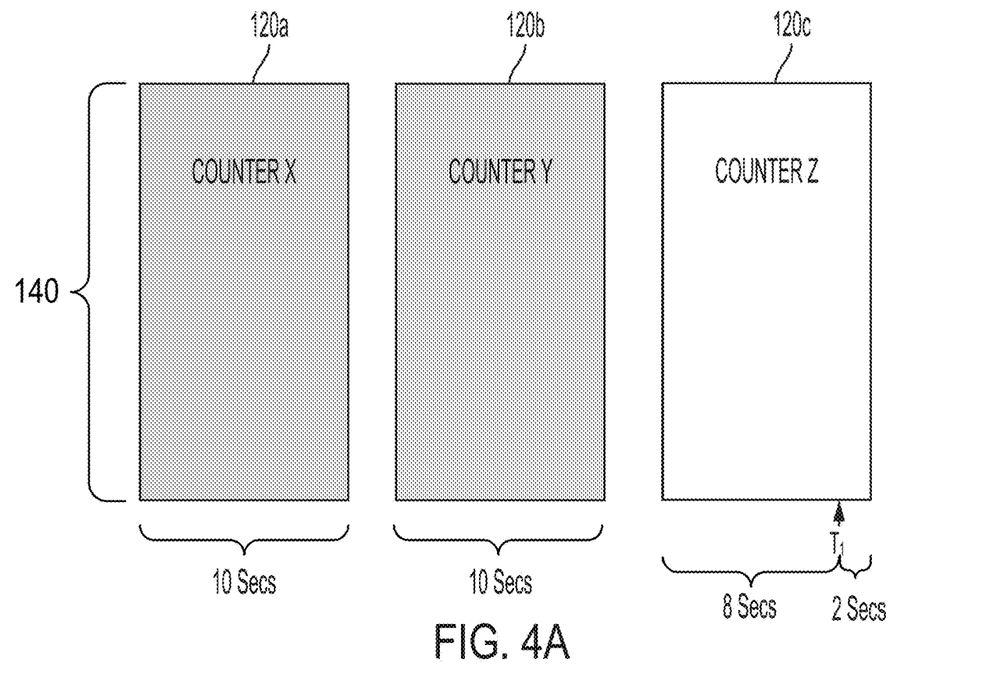
FIGS. 4A-4B are conceptual diagrams of an example counter subset associated with a radio channel, for use by the gating system, according to some implementations of the invention.
Figure 4B:
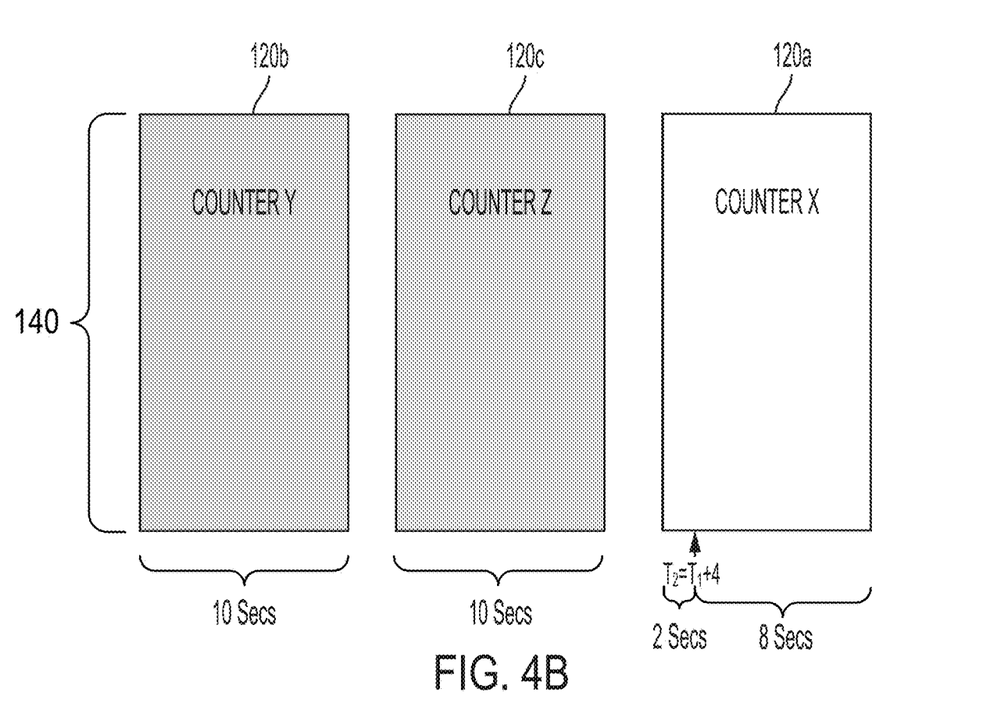

FIGS. 4A-4B are conceptual diagrams of an example counter subset 140 corresponding to a single radio channel 115, according to some implementations. The counter subset 140 shown in the example of FIGS. 4A and 4B includes a first counter 120a, a second counter 120b, and a third counter 120c, which are referred to collectively as counters 120. The node 105 may store and use such a counter subset 140 for each radio channel 115 used by the node 105, and the scheduling engine 150 may use each counter subset 140 to track the spent dwell time on the corresponding radio channel 115. Specifically, FIG. 4A illustrates a counter subset 140 at a time $T_1$, and FIG. 4B illustrates the same counter subset 140 at time $T_2=T_1+4$, or four seconds after time $T_1$.

A counter subset 140 includes one or more counters 120. In some implementations, each counter 120 in a counter subset 140 represents a fixed time window, also referred to herein as a fixed window, having a start time and an end time. Thus, a counter 120 may keep track of dwell time spent during the corresponding fixed time window. More specifically, for example, each counter 120 may be a numerical value indicating how much dwell time has been used in the corresponding fixed time window (i.e., in the span of time between the corresponding start time and end time). For instance, each counter 120 may represent a number of milliseconds of dwell time used in the corresponding fixed time window. In some implementations, the various counters 120 within a counter subset 140 represent fixed time windows with a common width (i.e., the same length of time). Further, the fixed time windows represented by a counter subset 140 at a given time may be consecutive, and as time passes, a counter 120 may periodically be reset and its fixed time window updated to a new start time at the end of the consecutive fixed time windows represented by the other counters 120 in the counter subset 140. When a counter 120 is updated as such, its new fixed time window may have the same length as its previous fixed time window and the same length of other fixed time windows represented by the counter subset 140. Upon being updated, the counter 120 may begin keeping track of spent dwell time within its new fixed time window. Thus, the fixed time windows represented by a counter subset 140 may dynamically change to keep up with the current time. As will be described in more detail below, the combination of consecutive fixed time windows of the counters 120 within a counter subset 140 may represent a rolling time window to which a dwell time limit applies.

In some implementations, the sum of the lengths of time represented by the counters 120 of a counter subset 140 exceeds, or at least meets, the length of the rolling time window for which dwell time is being tracked. More specifically, in some implementations, each counter 120 represents the same length of time, L, and the number of counters 120 in the counter subset is one plus the floor of R/L, which can also be written as $\lfloor R/L \rfloor+1$, where R is the length of the rolling time window. While some implementations utilize a value of L such that both L and $\lfloor R/L \rfloor$ are integers, it will be understood that the use of integers for these values is not required. In the example of FIGS. 4A-4B, each counter 120 represents a ten-second window within a twenty-second rolling time window, and the total number of counters 120 in the counter subset 140 is three, because $\lfloor 20/10 \rfloor+1=3$.

At a given time, the counter subset 140 may include one active counter 120 representing a fixed time window that includes the current time. As dwell time is spent, the spent dwell time may be recorded in the active counter 120, such as by incrementing (i.e., increasing) the active counter 120 by the amount of dwell time spent. In some implementations, each counter 120 measures the dwell time spent in milliseconds and is thus incremented as needed by the amount of milliseconds used to transmit data packets while the counter 120 remains active. The remaining counters 120 may be deemed inactive, in that dwell time spending is not currently being counted on the inactive counters 120. Each inactive counter 120 may represent a fixed time window that has passed. In some implementations, the counters 120 in the counter subset 140 represent consecutive fixed time windows, with the active counter 120 being current and the inactive counters representing the recent past. In FIGS. 4A and 4B, the respective active counter 120 of each figure appears with a white background, while the inactive counters 120 appear with gray backgrounds. In FIG. 4A, the active counter 120 is the counter 120c that includes time $T_1$, while in FIG. 4B, the active counter 120 is the counter 120a that includes time $T_2=T_1+4$.

In some implementations, the counter subset 140 representing a radio channel 115 currently being used is active, and within that counter subset 140, the counter 120 representing a current fixed time window is active. Each time a data packet is sent over a radio channel 115, the scheduling engine 150 may increment the active counter 120 in the active counter subset 140 by a value indicating the time used to transmit the data packet. In other words, when a data packet is transmitted over a radio channel 115, the active counter 120 in the counter subset 140 associated with that radio channel 115 may be incremented by the time needed to transmit the packet. Thus, the active counter 120 maintains the dwell time spent in a fixed time window that includes the current time.

Before transmitting each data packet over a radio channel 115, however, the scheduling engine 150 may consult the counter subset 140 associated with the radio channel 115, to determine whether enough dwell time remains in the rolling time window to complete transmission of the data packet. More specifically, if the data packet is in the allowed class, the scheduling engine 150 may subtract the time recorded in the counter subset 140 from the dwell time limit for the rolling time window. If the difference is no less than the estimated transmission time (i.e., duration) for the data packet, then the scheduling engine 150 may transmit the data packet over the current radio channel 115. If the difference is less than the estimated transmission time for the data packet, the scheduling engine 150 may hold the packet. In contrast, if the data packet is in the restricted class, the scheduling engine 150 may subtract the time recorded in the counter subset 140 from the dwell time limit less the reserved time. If the difference is no less than the estimated transmission time for the data packet, then the scheduling engine 150 may transmit the data packet over the radio channel 115. If the difference is less than the estimated transmission time for the data packet, the scheduling engine 150 may hold the packet.

At some point, as time passes, the fixed time window represented by the active counter 120 will end; specifically, this fixed time window ends when the current time meets the end time of the fixed time window. For illustrative purposes, counter 120a, counter 120b, and counter 120c shown in FIGS. 4A and 4B are respectively labeled as Counter X, Counter Y, and Counter Z. In this example, FIG. 4A illustrates a moment in time, $T_1$, when Counter Z is the active counter 120. The ten-second time window that Counter Z represents starts at time $T_1-8$ and ends at time $T_1+2$. At time $T_1+2$, the counter set 130 is updated to utilize a different active counter 120. To this end, Counter Z is deactivated, thereby becoming inactive. Because only three counters 120 are needed at a time in this example, and because a counter 120 is needed to represent a current time window, Counter X is reset (e.g., to a zero value) and used as the new active counter 120. More generally, in some implementations, when the current time progresses past the fixed time window represented by the active counter 120, the active counter 120 becomes inactive, and the oldest counter 120 (i.e., the counter 120 that has been active least recently) is reset to become the new active counter 120.

The reset and reuse of the oldest counter 120 may be implemented in various ways. In this example, Counter X in FIG. 4A is the same as Counter X in FIG. 4B, Counter Y in FIG. 4A is the same as Counter Y in FIG. 4B, and Counter Z in FIG. 4A is the same as Counter Z in FIG. 4B. For instance, if each counter 120 is represented by a specific variable or register, then a common variable or register may be used for Counter X in FIG. 4A and for Counter X in FIG. 4B. Alternatively, however, the variable or register used to implement the oldest counter 120 may become unused (e.g., by being released), and a new variable or register may be used for a new version of that counter 120. Thus, in some implementations, the quantity of counters 120 in the counter subset 140 remains constant. It will be understood by one skilled in the art that many implementations of these counters 120 are possible.

It will be understood that the use of counters 120 as described above tends to overestimate the dwell time already used. For instance, at time $T_1$ shown in FIG. 4A, the counter subset 140 indicates dwell time spent over the past twenty-eight seconds, rather than only the last twenty seconds. At time $T_2=T_1+4$ shown in FIG. 4B, the counter subset 140 indicates dwell time spent over the past twenty-two seconds leading up to time $T_2$. In some implementations, this mechanism guarantees that the spent dwell time is not underestimated, but it is possible that a data packet is held based on the spent dwell time over a period longer than the rolling time window.

To increase precision, the number of counters 120 used may be increased, and the length of time represented by each counter 120 may be decreased. For example, if five counters 120 are used, with each counter 120 representing a five-second time window, then the greatest span of time over which spent dwell time is saved in the counter subset 140 at a given time is twenty-five seconds. For another example, if twenty-one counters 120 are used, with each counter 120 representing a one-second time window, then the greatest span of time over which spent dwell time is saved in the counter subset 140 at a given time is twenty-one seconds.

Figure 5A:
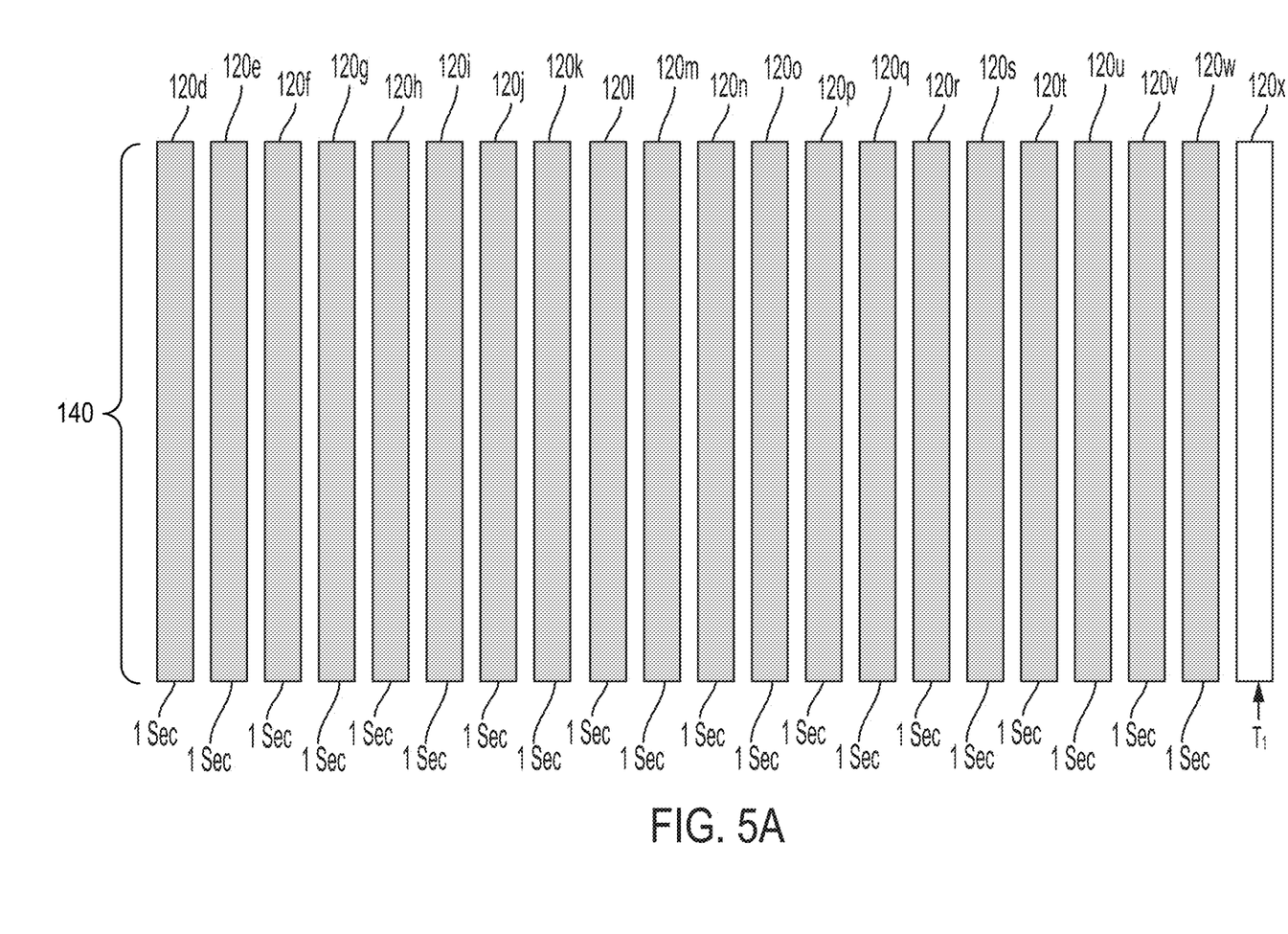
FIGS. 5A-5B are conceptual diagrams of another example counter subset associated with a radio channel, for use by the gating system, according to some implementations of the invention.
Figure 5B:
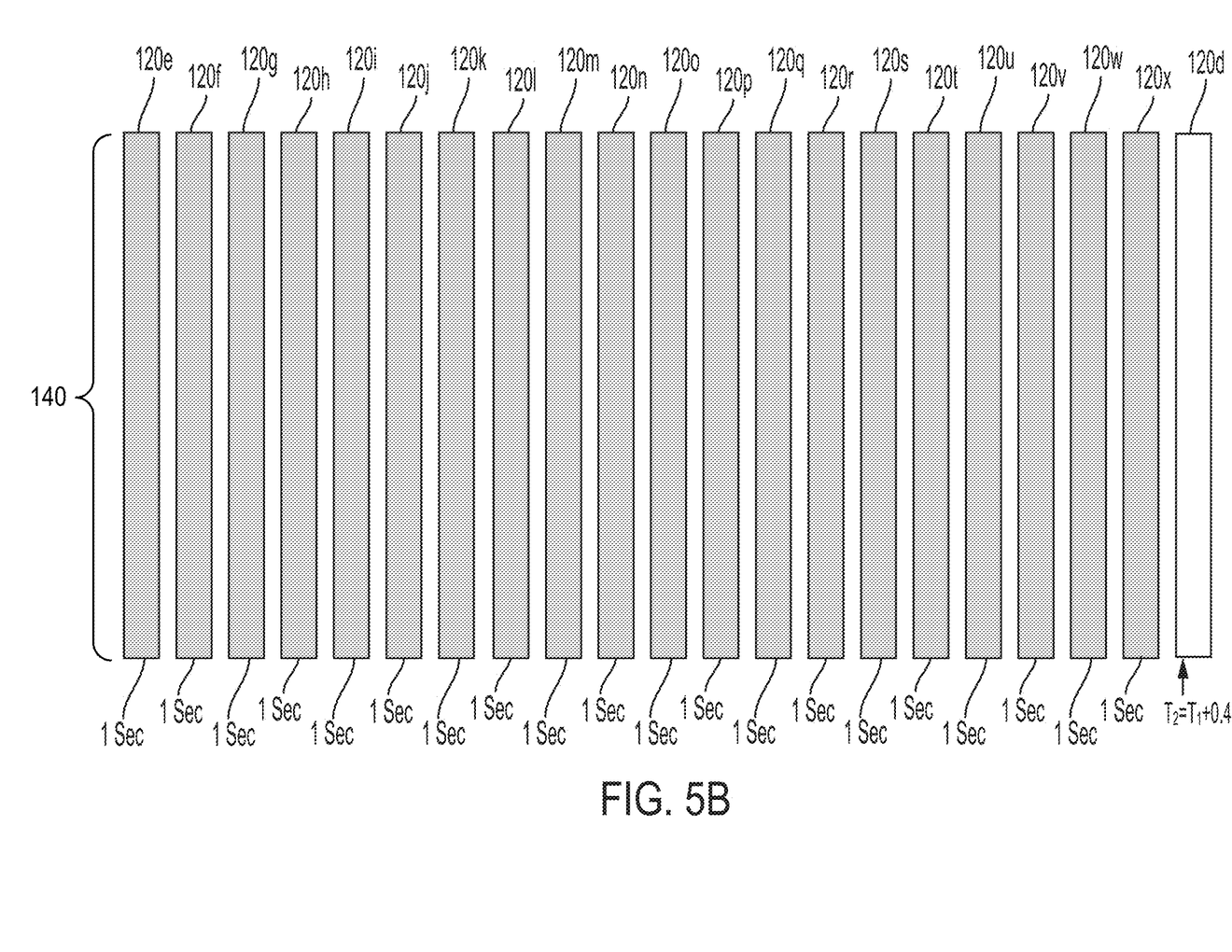

FIGS. 5A-5B are conceptual diagrams of a second example counter subset 140 corresponding to a single radio channel 115, according to some implementations. The counter subset 140 shown in the example of FIGS. 5A and 5B includes twenty-one counters 120*d*-120*x*, each of which corresponds to a one-second fixed window based on a total twenty-second rolling time window. An example node 105 may store and use such a counter subset 140 for each radio channel 115 used by the node 105, and the scheduling engine 150 may use each counter subset 140 to track the spent dwell time on the corresponding radio channel 115. Specifically, FIG. 5A illustrates a counter subset 140 at a time $T_1$, and FIG. 5B illustrates the same counter subset 140 at time $T_2=T_1+0.4$, or four hundred milliseconds after time $T_1$.

At time $T_1$, Counter 120*x* is the active counter 120, and each time the node 105 transmits a data packet while this counter 120 is active, Counter 120*x* is incremented by the time needed to transmit such data packet. At some point, as time passes, the fixed time window represented by Counter 120*x* will end; specifically, this fixed time window ends when the current time meets the end time of the corresponding fixed time window. At time $T_2$, which is four hundred milliseconds after $T_1$, the fixed time window corresponding to Counter 120*x* has ended, and thus, the counter 120 that was oldest, Counter 120*d*, was reset to become the active counter 120. Thus, as shown in FIG. 5B, at time $T_2$, Counter 120*d* is the active counter, and Counter 120*x* is now inactive, representing a fixed time window that has passed.

In this second example of FIGS. 5A-5B, suppose that $T_1$ occurs with three hundred milliseconds remaining in the fixed time window corresponding to Counter 120*x* (i.e., $T_1$ occurs seven hundred milliseconds into the fixed time window), and suppose that $T_2$ occurs one hundred milliseconds into the new fixed time window corresponding to Counter 120*d* after its reset, such that $T_2$ occurs four hundred milliseconds after $T_1$. In that case, at $T_1$, the counter subset 140 indicates dwell time spent over the past 20.7 seconds, which spans until seven hundred milliseconds into the fixed time window of Counter 120*x*; at $T_2$, the counter subset 140 indicates dwell time spent over the past 20.1 seconds, which spans until one hundred milliseconds into the fixed time window of Counter 120*d*, where the rolling time window is twenty seconds long. As discussed above, this mechanism of including one more counter 120 than would be required to equal the length of the rolling time window guarantees that the spent dwell time is not underestimated. As compared to the example of FIGS. 4A-4B, however, this second example is more precise but requires more space for maintaining the additional counters 120.

An increase in the quantity of counters 120 tends to increase storage space used. For example, and not by way of limitation, suppose a respective counter subset 140 is used for each of sixty-four radio channels 115, and further suppose that each counter subset 140 includes twenty-one counters 120 to support the tracking of twenty-one one-second fixed time windows representing a twenty-second rolling time window. In this example, each counter 120 is represented by a sixteen-bit integer that represents milliseconds of dwell time spent (i.e., used) during the corresponding one-second fixed time window. Storage of these counters 120 then requires twenty-one sixteen-bit integers for each of the sixty-four channels, or 2688 bytes, where a byte is eight bits. In contrast, if only three counters 120 are used per channel, then this storage space is reduced by seven times to only 384 bytes. If the node 105 is a utility meter 300 or other device on which storage 250 is limited, it may be impractical to increase precision by giving up storage space.

Figure 6:
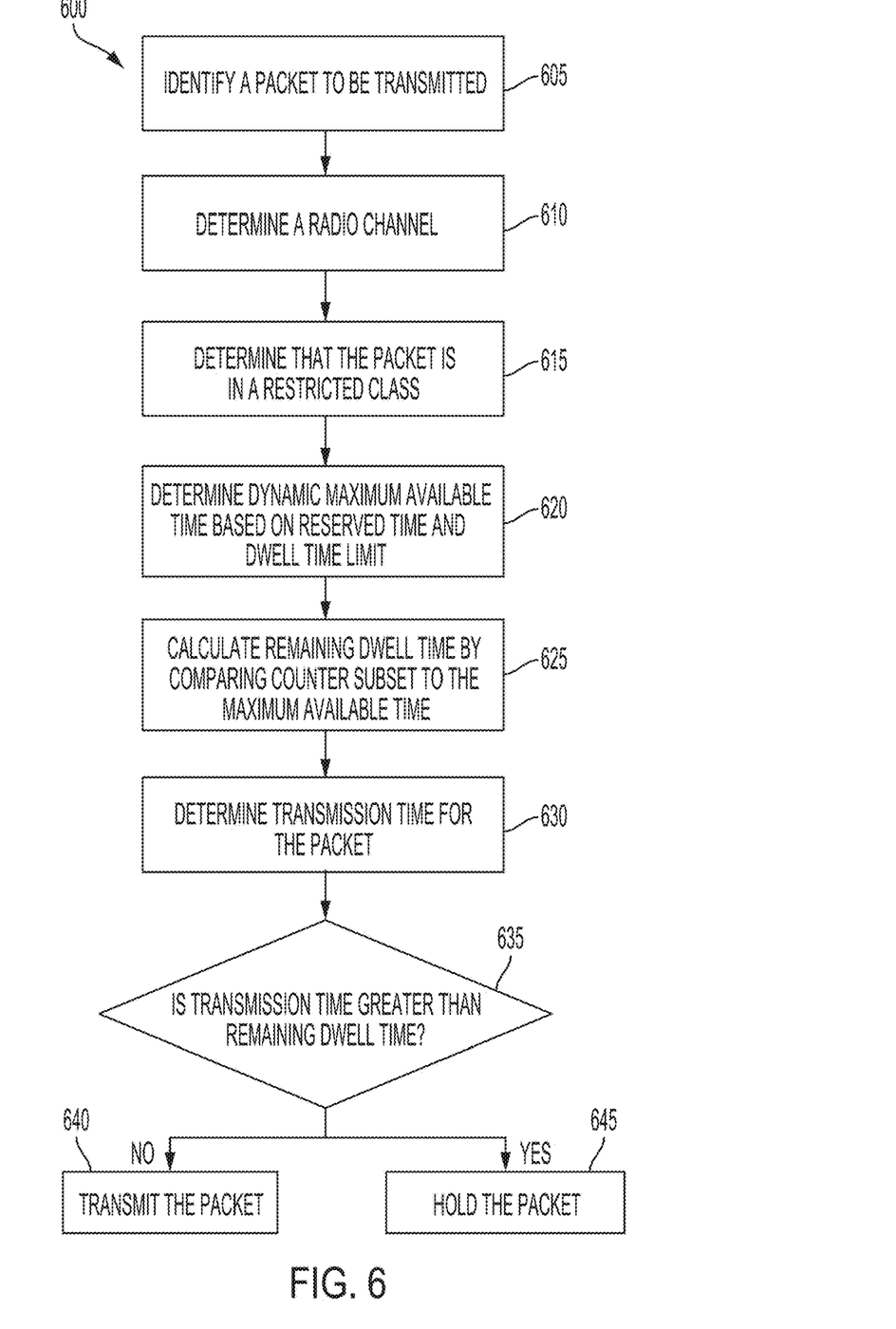
FIG. 6 is a flow diagram of a method of gating a restricted packet for radio transmission, according to some implementations of the invention.

FIG. 6 is a flow diagram of a method 600 of gating (i.e., determining whether to send) a restricted packet for radio transmission, according to some implementations of this invention. In some implementations, this method 600 is performed in whole or in part by the scheduling engine 150 on the node 105. It will be understood that this method 600 is provided for illustrative purposes as an example of a method 600 for scheduling a restricted packet.

At block 605 of the method 600, the scheduling engine 150 identifies a packet to be transmitted via radio 110. For instance, the scheduling engine 150 may receive a reference to the packet. In some implementations, such as when the scheduling engine 150 is integrated into a utility meter 300, the utility meter 300 performs one or more processes for periodically transmitting beacons, for transmitting consumption data describing consumption of a resource 310, or for transmitting other types of packets. In a node 105 other than a utility meter 300, other processes may run. In either case, such a process may notify the scheduling engine 150 that a packet, in the form of a beacon, consumption data, or other data, is ready to be transmitted. Additionally or alternatively, the scheduling engine 150 may monitor communications between processes and the radio 110, so as to intercept a request to transmit a packet. It will be understood that many mechanisms exist whereby the scheduling engine 150 becomes aware of, and therefore identifies, a data packet to be transmitted.

At block 610, the scheduling engine 150 determines a radio channel 115 over which the data packet might be sent. For instance, in some implementations, the node 105 hops among radio channels 115 according to a schedule; in that case, a current radio channel 115 is determined based on an established channel-hopping sequence and a current time slot. The scheduling engine 150 may identify this current radio channel 115 as the channel 115 over which the data packet might be sent, because other devices sharing a network with the node 105 may expect to receive the data packet over the current channel 115.

At block 615, the scheduling engine 150 determines to which class the packet belongs and, more specifically, in this example, that the packet belongs to the restricted class. To this end, for example, the scheduling engine 150 may compare the size or duration of the packet to a threshold. For instance, a packet of greater than a threshold size may be classified as non-administrative or a packet that would take at least a threshold duration to transmit may be classified as non-administrative. For another example, the scheduling engine 150 may analyze the contents of the packet to determine a classification of the packet. For instance, the scheduling engine 150 may recognize the packet as consumption data and may therefore classify the packet as non-administrative. If only administrative packets are in the allowed class, the scheduling engine 150 therefore determines that the packet belongs to the restricted class. Additionally or alternatively, the scheduling engine 150 may determine the class of the packet in the same manner, or a similar manner, by which the packet itself is identified. For instance, a process that requests transmission of the packet may notify the scheduling engine 150 of the class or may provide an indication identifying the class of the packet.

At block 620, the scheduling engine 150 determines a maximum available time applicable to the packet based on both the dwell time limit and the reserved time. In some implementations, this determination requires subtracting the reserved time from the dwell time limit. For instance, where the dwell time limit is four hundred milliseconds and the reserved time is twenty milliseconds, then the maximum available time for this packet in the restricted class is 380 milliseconds. For another example, however, the scheduling engine 150 may have access to a mapping from classes to maximum available times. In that case, the scheduling engine 150 may look up the maximum available time of a packet in the restricted class, and may thereby determine that the maximum available time is 380 milliseconds.

At block 625, the scheduling engine 150 calculates the remaining dwell time on the radio channel 115. In some implementations, calculating the remaining dwell time involves subtracting, from the maximum available time, the value of the counter subset 140 associated with the current radio channel 115. The value of the counter subset 140 may be the sum of the various counters 120 in the counter subset 140. For instance, in the example of FIGS. 4A and 4B, if the counters 120 are implemented as numerical values, then the value of the counter subset 140 is the sum of Counter X, Counter Y, and Counter Z. This value may be subtracted from the maximum available time to determine the remaining dwell time. In this example, because the reserved time was considered when determining the maximum available time, the remaining dwell time does not count the reserved time and, thus, leaves the reserved time available in the dwell time limit.

At block 630, the scheduling engine 150 determines a transmission time for the packet, where the transmission time may be an estimate of how long it takes to transmit the packet via radio 110. In some implementations, a size of the packet can be determined based, for example, on an examination of the packet or an examination of metadata associated with the packet, and a transmission rate for radio transmissions is known. Thus, the scheduling engine 150 may determination transmission time by multiplying the size by the transmission rate.

At decision block 635, the scheduling engine 150 determines whether the transmission time is greater than the remaining dwell time on the radio channel 115. In other words, the scheduling engine 150 determines whether the packet can be transmitted within the dwell time limit where the reserved time is excluded for sending this packet. If the transmission time is not greater than the remaining dwell time, the scheduling engine 150 may initiate transmission of the packet at block 640. For instance, the scheduling engine 150 may instruct the radio 110 to transmit the packet, and the radio 110 may do so. However, if the transmission time is greater than the remaining dwell time, the packet is held (e.g., postponed) at block 645. For instance, the scheduling engine 150 may re-queue the packet for sending after the node 105 switches to a different radio channel 115. However, at a future time, when it is determined that the packet can be transmitted within the dwell time limit less the reserved time, the scheduling engine 150 may initiate transmission of the packet.

Figure 7:
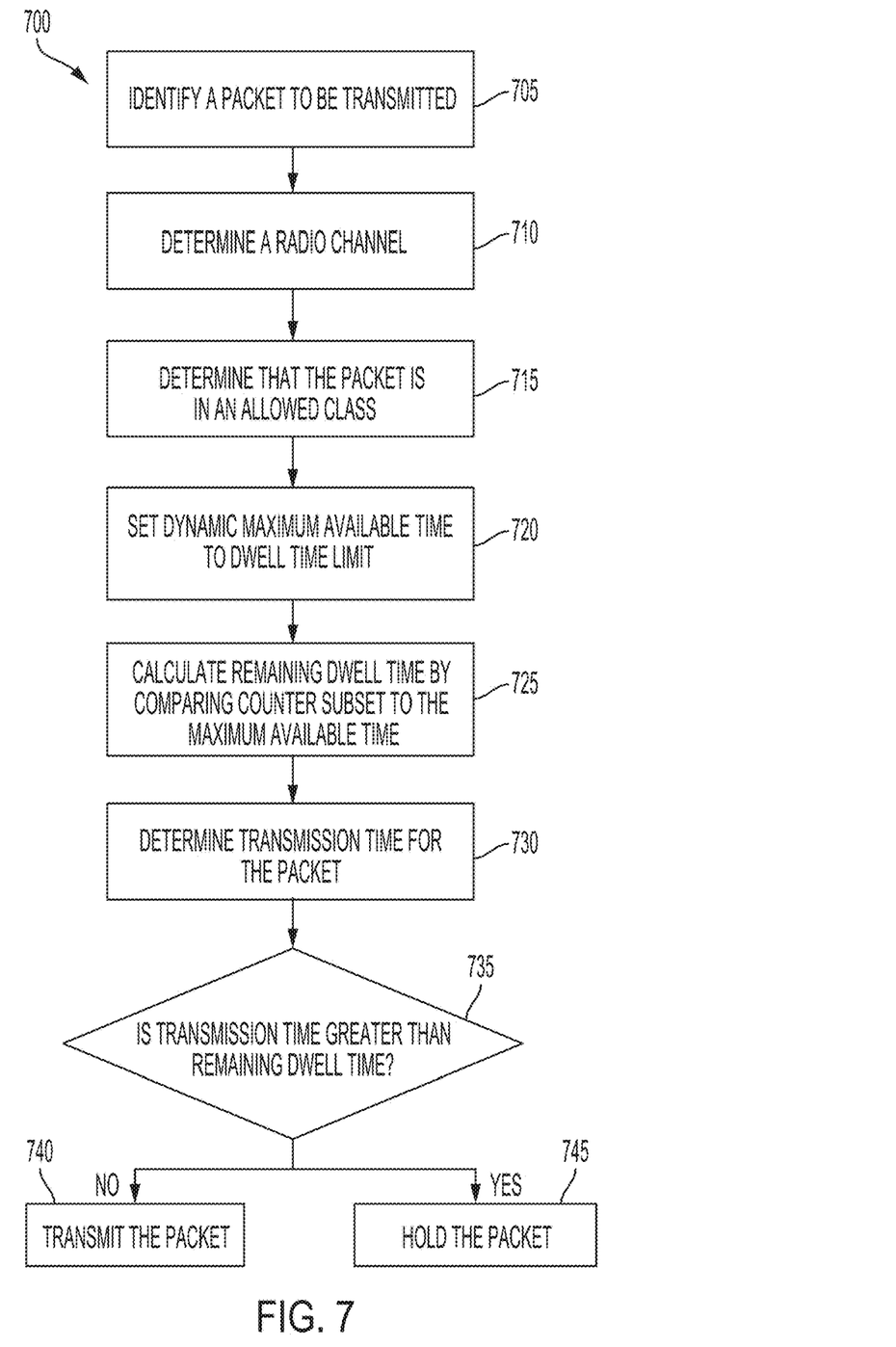
FIG. 7 is a flow diagram of a method of gating an allowed packet for radio transmission, according to some implementations of the invention.

FIG. 7 is a flow diagram of a method 700 of scheduling an allowed packet for radio transmission, according to some implementations of this invention. In some implementations, this method 700 is performed in whole or in part by the scheduling engine 150 on the node 105. It will be understood that this method 700 is provided for illustrative purposes as an example of a method 700 for scheduling an allowed packet.

At block 705 of the method 700, the scheduling engine 150 identifies a packet to be transmitted via radio 110. For instance, the scheduling engine 150 may receive a reference to the packet. In some implementations, such as when the scheduling engine 150 is integrated into a utility meter 300, the utility meter 300 performs one or more processes for periodically transmitting beacons, for transmitting consumption data describing consumption of a resource 310, or for transmitting other types of packets. In a node 105 other than a utility meter 300, other processes may run. In either case, such a process may notify the scheduling engine 150 that a packet, in the form of a beacon, consumption data, or other data, is ready to be transmitted. Additionally or alternatively, the scheduling engine 150 may monitor communications between processes and the radio 110, so as to intercept a request to transmit a packet. It will be understood that many mechanisms exist whereby the scheduling engine 150 becomes aware of, and therefore identifies, a data packet to be transmitted.

At block 710, the scheduling engine 150 determines a radio channel 115 over which the data packet might be sent. For instance, in some implementations, the node 105 hops among radio channels 115 according to a schedule; in that case, a current radio channel 115 is determined based on an established channel-hopping sequence and a current time slot. The scheduling engine 150 may identify this current radio channel 115 as the channel 115 over which the data packet might be sent, because other devices sharing a network with the node 105 may expect to receive the data packet over the current channel 115.

At block 715, the scheduling engine 150 determines to which class the packet belongs and, more specifically, in this example, that the packet belongs to the allowed class. To this end, for example, the scheduling engine 150 may compare the size or duration of the packet to a threshold. For instance, a packet of less than a threshold size may be classified as administrative or a packet that would take less than a threshold duration to transmit may be classified as administrative. For another example, the scheduling engine 150 may analyze the contents of the packet to determine a classification of the packet. For instance, the scheduling engine 150 may recognize the packet as a beacon and may therefore classify the packet as administrative. If all administrative packets are in the allowed class, the scheduling engine 150 therefore determines that the packet belongs to the allowed class. Additionally or alternatively, the scheduling engine 150 may determine the class of the packet in the same manner, or a similar manner, by which the packet itself is identified. For instance, a process that requests transmission of the packet may notify the scheduling engine 150 of the class or may provide an indication identifying the class of the packet.

At block 720, the scheduling engine 150 sets a maximum available time to the dwell time limit. For example, upon recognizing the packet as belonging to the allowed class, the scheduling engine 150 may simply set the maximum available time equal to the dwell time limit. For another example, however, the scheduling engine 150 may have access to a mapping from classes to maximum available times, where the allowed class is mapped to the dwell time limit. In that case, the scheduling engine 150 may look up the maximum available time of a packet in the allowed class, and may thereby identify the maximum available time as the dwell time limit.

At block 725, the scheduling engine 150 calculates the remaining dwell time on the radio channel 115. In some implementations, calculating the remaining dwell time involves subtracting, from the maximum available time, the value of the counter subset 140 associated with the current radio channel 115. The value of the counter subset 140 may be the sum of the various counters 120 in the counter subset 140. For instance, in the example of FIGS. 4A and 4B, if the counters 120 are implemented as numerical values, then the value of the counter subset 140 is the sum of Counter X, Counter Y, and Counter Z. This value may be subtracted from the maximum available time to determine the remaining dwell time. In this example, the reserved time is not considered or withheld. The remaining dwell time includes time that is reserved because, in some implementations, the reserved time is specifically intended for allowed packet. Thus, the allowed packet in question is allowed to use the reserved time.

At block 730, the scheduling engine 150 determines a transmission time for the packet, where the transmission time may be an estimate of how long it takes to transmit the packet via radio 110. In some implementations, a size of the packet can be determined based, for example, on an examination of the packet or an examination of metadata associated with the packet, and a transmission rate for radio transmissions is known. Thus, the scheduling engine 150 may determination transmission time by multiplying the size by the transmission rate.

At decision block 735, the scheduling engine 150 determines whether the transmission time is greater than the remaining dwell time on the radio channel 115. In other words, the scheduling engine 150 determines whether the packet can be transmitted within the dwell time limit. If the transmission time is not greater than the remaining dwell time, the scheduling engine 150 may initiate transmission of the packet at block 740. For instance, the scheduling engine 150 may instruct the radio 110 to transmit the packet, and the radio 110 may do so. However, if the transmission time is greater than the remaining dwell time, the packet is held (e.g., postponed) at block 745. For instance, the scheduling engine 150 may re-queue the packet for sending after the node 105 switches to a different radio channel 115. However, at a future time, when it is determined that the packet can be transmitted within the dwell time limit, the scheduling engine 150 may initiate transmission of the packet.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

The features discussed herein are not limited to any particular hardware architecture or configuration. A computing device, such as a node 105, can include any suitable arrangement of components that provide a result conditioned on one or more inputs. Suitable computing devices include multipurpose microprocessor-based computer systems accessing stored software (i.e., computer-readable instructions stored on a memory of the computer system) that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied; for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation and does not preclude inclusion of such modifications, variations, or additions to the present subject matter as would be readily apparent to one of ordinary skill in the art.

What is claimed is:

1. A method for gating data transmissions, the method comprising:
   identifying a first packet for transmission;
   determining a radio channel for the transmission of the first packet;
   determining that the first packet is in a restricted class;
   determining a dynamic maximum available time applicable to the first packet on the radio channel, based on a reserved time and a dwell time limit, responsive to the first packet being in the restricted class;
   calculating a first remaining dwell time on the radio channel based on a comparison of a first spent dwell time on the radio channel to the dynamic maximum available time applicable to the first packet;
   determining a first transmission duration for transmitting the first packet over the radio channel;
   postponing the first packet responsive to the first remaining dwell time being less than the first transmission duration,
   determining that a second packet is in an allowed class;
   setting the dynamic maximum available time applicable to the second packet on the radio channel to the dwell time limit, responsive to the second packet being in the allowed class:
   calculating a second remaining dwell time on the radio channel based on a comparison of a second spent dwell time on the radio channel to the dynamic maximum available time applicable to the second packet;
   determining a second transmission duration for transmitting the second packet over the radio channel; and
   postponing the second packet responsive to the second remaining dwell time being less than the second transmission duration.

2. The method of claim 1, wherein determining the dynamic maximum available time comprises subtracting the reserved time from the dwell time limit, responsive to the first packet being in the restricted class.

3. The method of claim 1, wherein the dynamic maximum available time for a packet is based on whether the packet is in the allowed class.

4. The method of claim 1, further comprising:
dividing a rolling time window into two or more fixed time windows;
assigning a counter subset to the radio channel, the counter subset comprising two or more counters together representing a spent dwell time of the radio channel in a rolling time window;
assigning each counter of the counter subset to a respective fixed time window of the two or more fixed time windows; and
determining the first spent dwell time based on a sum of the two or more counters in the counter subset.

5. The method of claim 4, further comprising:
transmitting the first packet over the radio channel; and
increasing, by the first transmission duration, a first counter in the counter subset, wherein the first counter is assigned to a first fixed time window including a time at which the first packet is transmitted.

6. The method of claim 4, further comprising assigning a respective counter subset to each radio channel of a plurality of available radio channels, wherein each counter subset represents a respective spent dwell time of the respective radio channel within the rolling time window.

7. The method of claim 1, wherein:
determining the dynamic maximum available time comprises subtracting the reserved time from the dwell time limit; and
calculating the first remaining dwell time comprises:
dividing a rolling time window into two or more fixed time windows;
assigning each counter of a counter subset, comprising two or more counters together representing a spent dwell time, to a respective fixed time window of the two or more fixed time windows;
determining the first spent dwell time based on a sum of the two or more counters in the counter subset; and
subtracting the first spent dwell time from the dynamic maximum available time.

8. The method of claim 7, further comprising:
dividing the rolling time window into two or more fixed time windows; and
for each radio channel of a plurality of available radio channels, assigning each counter of a respective counter subset to a corresponding fixed time window of the two or more fixed time windows;
wherein, for each radio channel of the plurality of available radio channels, each counter in the respective counter subset represents a respective partial spent dwell time in the corresponding fixed time window.

9. A node comprising:
a radio configured to transmit a plurality of packets across a plurality of available radio channels;
a processor configured to execute computer-readable instructions; and
a memory configured to store the computer-readable instructions that, when executed by the processor, cause the processor to perform operations comprising:
identifying a first packet for transmission;
determining a radio channel, of the plurality of available radio channels, for the transmission of the first packet;
determining that the first packet is in a restricted class;
determining a dynamic maximum available time on the radio channel applicable to the first packet based on a reserved time and a dwell time limit, responsive to the first packet being in the restricted class;
calculating a first remaining dwell time on the radio channel based on a comparison of a first spent dwell time on the radio channel to the dynamic maximum available time applicable to the first packet;
determining a first transmission duration for transmitting the first packet over the radio channel;
postponing the first packet responsive to the first remaining dwell time being less than the first transmission duration,
determining that a second packet is in an allowed class;
setting the dynamic maximum available time applicable to the second packet on the radio channel to the dwell time limit, responsive to the second packet being in the allowed class:
calculating a second remaining dwell time on the radio channel based on a comparison of a second spent dwell time on the radio channel to the dynamic maximum available time applicable to the second packet;
determining a second transmission duration for transmitting the second packet over the radio channel; and
postponing the second packet responsive to the second remaining dwell time being less than the second transmission duration.

10. The node of claim 9, wherein the node is a utility meter.

11. The node of claim 8, further comprising a counter set comprising a plurality of counter subsets, each counter subset assigned to a respective radio channel of the plurality of available radio channels, and the operations further comprising:
transmitting, by the radio, the second packet over the radio channel; and
increasing, by the first transmission duration, a first counter in a counter subset assigned to the radio channel, wherein the first counter is assigned to a first fixed time window including a time at which the first packet is transmitted.

12. The node of claim 9, wherein the dynamic maximum available time for a packet is based on whether the packet is in the allowed class.

13. The node of claim 9, the operations further comprising:
dividing a rolling time window into two or more fixed time windows;
assigning a counter subset to the radio channel, the counter subset comprising two or more counters together representing a spent dwell time of the radio channel in a rolling time window;
assigning a first counter of the counter subset to a first fixed time window of the two or more fixed time windows, wherein the first counter indicates a partial spent dwell time in the first fixed time window;
transmitting, by the radio, the first packet over the radio channel; and
increasing the first counter by the first transmission duration, responsive to a time at which the first packet is transmitted falling within the first fixed time window.

14. The node of claim 13, further comprising assigning a respective counter subset to each radio channel of the plurality of available radio channels, wherein each counter subset represents a respective spent dwell time of the respective radio channel within the rolling time window.

15. The node of claim 14, wherein, for each radio channel of the plurality of available radio channels, each counter in the respective counter subset for the radio channel represents a respective partial spent dwell time in a corresponding fixed time window of the rolling time window.

16. A non-transitory computer-readable storage medium having program instructions for gating a radio transmission, the program instructions executable by a processor to cause the processor to perform a method comprising:

identifying a first packet for transmission;

determining a radio channel for the transmission of the first packet; determining that the first packet is in a restricted class;

determining a dynamic maximum available time applicable to the first packet on the radio channel based on a reserved time and a dwell time limit, responsive to the first packet being in the restricted class;

calculating a first remaining dwell time on the radio channel based on a comparison of a first spent dwell time on the radio channel to the dynamic maximum available time applicable to the first packet;

determining a first transmission duration for transmitting the first packet over the radio channel;

postponing the first packet responsive to the first remaining dwell time being less than the first transmission duration, determining that a second packet is in an allowed class;

setting the dynamic maximum available time applicable to the second packet on the radio channel to the dwell time limit, responsive to the second packet being in the allowed class;

calculating a second remaining dwell time on the radio channel based on a comparison of a second spent dwell time to the dynamic maximum available time applicable to the second packet;

determining a second transmission duration for transmitting the second packet over the radio channel; and postponing the second packet responsive to the second remaining dwell time being less than the second transmission duration.

17. The non-transitory computer-readable storage medium of claim 16, wherein the dynamic maximum available time for a packet is based on whether the packet is in the allowed class.

* * * * *